Feb. 2, 1971  J. W. ORNER  3,559,460
METHOD AND APPARATUS FOR DETECTING GROSS LEAKS
Filed Feb. 24, 1969
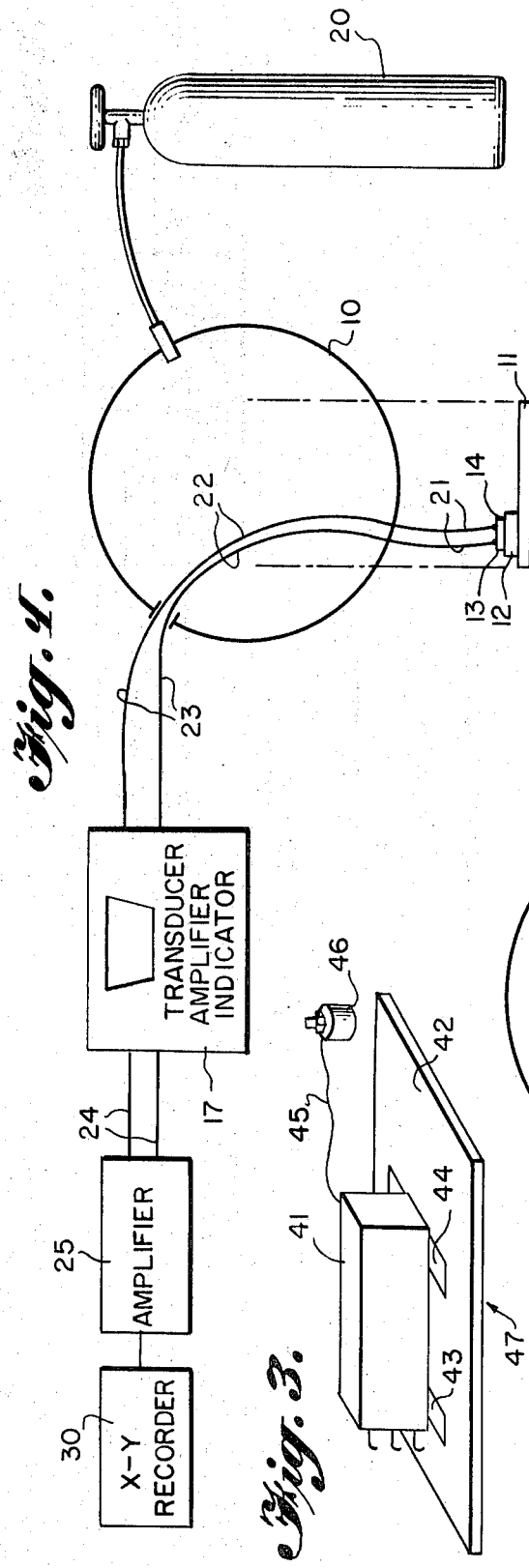
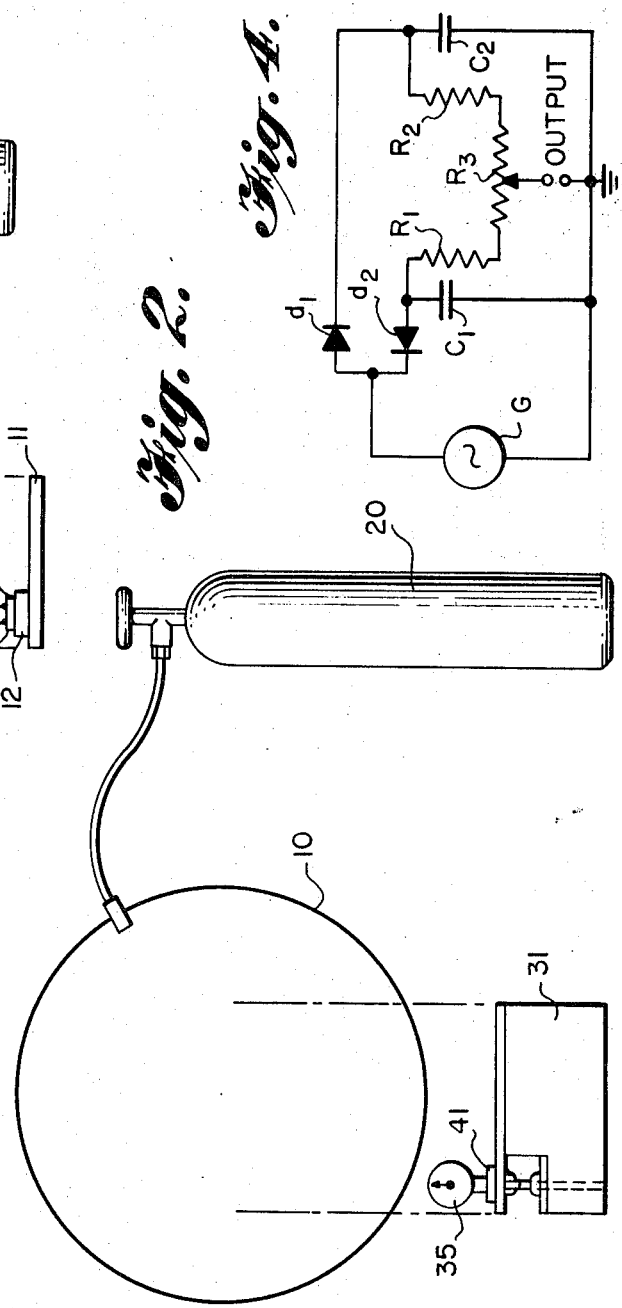
INVENTOR
JOHN W. ORNER
BY *Hme Cox*
*John R Manning*
ATTORNEYS

United States Patent Office 3,559,460
Patented Feb. 2, 1971

3,559,460
METHOD AND APPARATUS FOR DETECTING GROSS LEAKS
John W. Orner, Woburn, Mass., assignor to the United States of America as represented by the Administrator of the National Aeronautics and Space Administration
Filed Feb. 24, 1969, Ser. No. 801,660
Int. Cl. G01m 3/36
U.S. Cl. 73—49.3                                                                  7 Claims

ABSTRACT OF THE DISCLOSURE

The detection of gross leaks in hermetically sealed devices is accomplished by positioning a displacement transducer on or near a metal surface of the device. The device is placed in a zone wherein the device is subjected to increased gas pressure thereby causing deflection of the surface being sensed by the displacement transducer. If there is a leak in the device, the device will become internally pressurized thereby returning the deflected surface to its original condition. The displacement transducer is employed to sense the deflection of the surface as it occurs.

---

The invention described herein was made by an employee of the United States Government and may be manufactured and used by or for the Government for governmental purposes without the payment of any royalties thereon or therefor.

BACKGROUND OF THE INVENTION

Field of the invention

The invention relates to method and apparatus employing a displacement transducer to detect the presence of a gross leak in hermetically sealed semiconductor devices and is particularly applicable to detecting leaks in small electronic components such as transistors, sealed relays, etc.

Description of the prior art

In this regard, present methods of fine leak detection used for testing small sealed electronic components involving the use of helium have proved to be effective and adequate in the range from about $10^{-5}$ to $10^{-11}$ standard atm./cc. per second. They are inefficient and unreliable for leak rates larger than about $10^{-5}$ standard atm./cc. per second. Therefore, this invention pertains principally to these larger leak rates which are here defined as gross leaks.

Prior art methods used for gross leak detection in small sealed electronic devices involve such tests as immersion in hot liquid while examining for the escape of gas bubbles due to the thermal expansion of the internal air, or alternatively, the device is pressurized in an aqueous solution of detergent followed by a functional test of its electrical characteristics. Any penetration of the detergent solution will degrade the normal electrical performance of the device thereby indicating a gross leak in the sealed enclosure.

These methods of detecting gross leaks in small sealed devices have a number of disadvantages which not only add to the difficulty of testing, but also give rise to uncertainties and lack of reliability. For example, none of the methods in current use are readily adaptable to automation. The bubble method is almost entirely operator dependent, while the detergent system depends upon a comparison of electrical measurements made before and after pressurization in the detergent solution. In addition, it sometimes happens that a small amount of detergent solution enters the device through a relatively small leak and does not come into direct contact with any of the active electrical elements, thus the electrical performance of the device is not immediately affected, and the leak will not be detected. Furthermore, in such a case, the detergent solution may eventually find its way on to the active elements, particularly under the influence of vibration during its normal service life and a failure may result. Furthermore these methods are essentially qualitative only, in that no quantitative measurement of leak rate can be made.

It will be appreciated that in accordance with the present invention gross leaks may be detected and measured in hermetically sealed devices in which the leak rates are too large to be detected by the methods used for detecting fine leaks, such as the helium mass spectrometer method.

BRIEF SUMMARY OF INVENTION

The present leak testing method of the present invention depends upon the fact that when a sealed container is subjected to a change of ambient atmospheric pressure a mechanical displacement of the walls of the container will take place. As the internal gas pressure in the device equalizes with the outside pressure, by reason of a gross leak, the displacement will recover at an exponential rate. A measurement of the time constant of the exponential recovery rate, in conjunction with the known internal volume of the device, will enable calculation of the equivalent leak rate.

BRIEF DESCRIPTION OF THE DRAWINGS

In the drawings, wherein like reference characters are used throughout to designate like parts:

FIG. 1 is a schematic of one embodiment of the invention.

FIG. 2 is a schematic of another embodiment of the invention.

FIG. 3 is another embodiment employing a capacitance system.

FIG. 4 is the circuitry involved in carrying the method of FIG. 3.

DETAILED DESCRIPTION OF THE INVENTION

Now turning to a more detailed description of the invention taking into consideration FIG. 1, a test jig 11 is positioned in a pressure chamber 10. As an example of a device to be examined, a semiconductor device 12 is secured on the jig 11. A displacement transducer 13 is affixed to an external surface portion 14 of the device 12 so that as the surface is flexed by variations of the internal pressure of the device 12, the transducer 13 is subjected to compression. When the pressure chamber 10 is pressurized, the resultant differential pressure across the walls of the device 12 causes the surface portion 14 to flex inwardly thereby subjecting the transducer to compression to decrease the resistance of the transducer.

In pressurizing the chamber 10, it will be particularly useful to rapidly increase the pressure to a desired level, thereby achieving greatest deflection of the surfaces of the device undergoing testing. Obviously, pressurization in gradual increments permits the device to present normal surfaces as the pressure both inside and outside the device 12 reach equilibrium. Equilibrium is a function of the size of the leak to pressure differential with time period of achieving maximum desired pressurization being a variable factor. In the instant embodiment, the size of the leak is not important other than to note that the leak is a gross leak; therefore, pressurization must not be in small increments so that a time factor ensues for equilibrium to take place.

The pressurization is accomplished by feeding the chamber 10, which is of only relatively small volume, from a suitable source of gas such as contained in a cylinder 20. The pressurizing gas is preferably helium. The transducer 13 has suitable leads 21 connected to it, with a pair of conductors 22 in the wall of the chamber 10. A pair of leads 23 then go to a transducer amplifier indicator 17. The output therefrom may go to an amplifier indicator 25 by means of a pair of leads 24. An X–Y Recorder 30 may then be fed from the amplifier 25 for purposes of achieving a permanent record, as desired.

In the second embodiment, as can be seen from FIG. 2, a test jig 31 has mounted thereon a direct reading dial indicator 35 for measuring the deflection of the wall on the device 41. The linkage in this arrangement is mechanical in nature. Since the dial indicator 35, the jig 31 and the semiconductor device 41 must all be positioned in the chamber 10, the chamber 10 must be provided with viewing means such as a port and suitable lighting means (not illustrated) for viewing the indicator 35 in real time while it is in the chamber 10.

In conjunction with the above embodiment, the device 41 is placed in the jig 31. The direct dial device 35 (FIG. 2) is put into operative abutment therewith. The jig 31 is placed in the pressure chamber 10 or is already in the chamber 10 prior to positioning of the device therein. In the usual circumstances the chamber 10 will be of relatively small dimensions, so for ease of operation the electronic device is mounted on the jig 31 before placing it in the chamber 10. The chamber 10 is then closed. The pressure is then rapidly raised by the gas from the cylinder 20 until at least double atmospheric pressure is attained in the chamber 10. Under the aegis of the increased pressure the wall of the device will deflect.

Naturally, the degree of permissible pressurization will be somewhat limited as the pressure should not be so great to affect the structural capabilities of the device itself. One would not desire to collapse the device or cause a compressive failure of the device.

In the foregoing the method of the present invention has been directed to the concept of increased pressurization, so that when there is a gross leak externally supplied gas enters the device. However, the present invention includes the further concept of rapidly reducing the pressure in the chamber 10 to thereby achieve an outward deflection of the surfaces of the device until the gas in the device escapes through a leak if one is present. In this embodiment, the walls of the device are deflected outwardly to actuate the displacement transducer.

For further purposes of illustration, attention is directed to FIGS. 3 and 4. Demonstrated in the concept of test the hermetic seal of a relay 41 of square cross section. The relay 41 under test is placed upon a flat plate 42 upon which two strips of tape 43 and 44 have been placed in such a manner as to electrically insulate the case of the relay from the plate 42, but to leave a small air gap between the relay and the plate 42. The relay case is electrically connected by means of lead 45 to feed through terminal 46 through the bottom plate of a pressure vessel 47. Thus, the relay 41 and the flat plate 42 form the two plates of a condenser.

The external circuitry is shown in FIG. 4. It is a capacitance comparator circuit in which $C_1$ is the capacitance just described and $C_2$ is a standard capacitance of approximately the same value. Power is applied to the circuit from high frequency generator (G). Diode rectifiers ($d_1$ and $d_2$) are so connected as to charge $C_1$ and $C_2$ to opposite polarities and thus $R_3$ can be adjusted for zero voltage output. Any change in capacitance of either $C_1$ or $C_2$ will then cause a voltage to appear across the output terminals.

A rapid change in the gas pressure within the pressure vessel 47 will cause an equally rapid physical displacement of the relay case wall adjacent to plate 42 thus altering the thickness of the air gap, changing the capacitance between the relay case 41 and the flat plate 42, and causing a voltage to appear across the comparator circuit output terminals. If a gross leak in the sealed enclosure of the relay exists, an exponential recovery will occur at a rate which is proportional to the size of the leak. Thus, if the output voltage is monitored, as for example by a strip chart recorder, the gross leak can be readily detected and measured.

Several types of displacement transducers are commercially obtainable. Some require direct contact, while some do not. A good example of a non-contacting displacement transducer is the Aero-Vit System manufactured by the Kaman Nuclear Division of Kaman Corporation.

While there have been shown and described particular embodiments of the invention, it will be obvious to those skilled in the art that various changes and modifications may be made therein without departing from the invention, and, therefore, it is aimed to cover all such changes and modifications as fall within the spirit and scope of the invention.

What is claimed is:

1. A method for detecting gross leaks in hermetically sealed devices containing a quantity of free internal volume comprising:
    positioning deflection detecting means in operative relationship with respect to an external surface portion of said device,
    inserting said device in a pressure changing zone,
    rapidly increasing the differential pressure across said surface portion by varying the fluid pressure in said zone,
    detecting an initial deflection of said surface produced by an increase in said differential pressure,
    waiting for a reduction in said differential pressure produced by a net fluid flow through a leakage path in said sealed device, and
    detecting a second deflection of said surface produced by said decrease in differential pressure.

2. The method of claim 1 wherein the variation of pressure is accomplished by increasing the pressure in said zone by introducing a pressurizing gas, such as air.

3. The method of claim 2 wherein the pressurizing gas is helium.

4. The method of claim 1 wherein the sensing means is a displacement transducer which supplies a signal when said external surface portion of the device is deflected.

5. A gross leak tester for hermetically sealed devices comprising:
    work holder means for said devices,
    deflection sensing means in operative relationship with an external surface portion of said device so as to directly sense deflections thereof produced by differential pressure across the walls of said device,
    a chamber capable of relative gas pressure change retaining said work holder means, said device and said deflection sensing means,
    said sensing means being adapted to be connected to indicating means to indicate the degree of deflection of said surface portion as the pressure in said chamber is varied.

6. The leak tester of claim 5 including a source of pressurizing gas and said chamber is in communication with said source of gas.

7. The leak tester of claim 6 wherein the source of pressurizing gas is helium.

References Cited
UNITED STATES PATENTS

| | | | |
|---|---|---|---|
| 2,453,338 | 11/1948 | Pajak | 73—52 X |
| 2,658,819 | 11/1953 | Formwalt | 73—52 X |
| 2,754,677 | 7/1956 | New | 73—37 |

OTHER REFERENCES

IBM Technical Disclosure Bulletin, Gross Leak Detection, by J. J. Kennedy, vol. 5, No. 1, June 1962.

LOUIS R. PRINCE, Primary Examiner

W. A. HENRY II, Assistant Examiner